US007551211B2

(12) United States Patent
Taguchi et al.

(10) Patent No.: US 7,551,211 B2
(45) Date of Patent: Jun. 23, 2009

(54) APPARATUS AND METHOD FOR PROCESSING A PHOTOGRAPHIC IMAGE USING A STENCIL

(75) Inventors: Yasunori Taguchi, Tokyo (JP); Natsuko Ouchi, Tokyo (JP); Kazuhiro Izuka, Tokyo (JP); Yoshinori Yuki, Tokyo (JP); Yoshihiro Kataoka, Tokyo (JP); Takashi Ida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 681 days.

(21) Appl. No.: 10/890,175

(22) Filed: Jul. 14, 2004

(65) Prior Publication Data

US 2005/0046729 A1 Mar. 3, 2005

(30) Foreign Application Priority Data

Aug. 28, 2003 (JP) ............................. 2003-305509

(51) Int. Cl.
*H04N 5/262* (2006.01)
*H04N 5/222* (2006.01)

(52) U.S. Cl. ..................................................... 348/239

(58) Field of Classification Search ............ 348/231.99, 348/231.2, 231.3, 231.6, 239; 396/335–340
See application file for complete search history.

(56) References Cited

U.S. PATENT DOCUMENTS

| | | | | |
|---|---|---|---|---|
| 5,477,264 | A * | 12/1995 | Sarbadhikari et al. | 348/231.6 |
| 6,222,637 | B1 * | 4/2001 | Ito et al. | 358/1.18 |
| 6,335,985 | B1 | 1/2002 | Sambonsugi et al. | |
| 6,380,975 | B1 * | 4/2002 | Suzuki | 348/231.99 |
| 6,400,908 | B1 * | 6/2002 | Parulski | 396/311 |
| 6,556,243 | B1 * | 4/2003 | Dotsubo et al. | 348/231.2 |
| 6,621,524 | B1 * | 9/2003 | Yamamoto et al. | 348/584 |
| 2002/0171746 | A1 * | 11/2002 | Stephany et al. | 348/239 |
| 2003/0117501 | A1 | 6/2003 | Shirakawa | |
| 2003/0184815 | A1 | 10/2003 | Shiki et al. | |
| 2004/0017481 | A1 * | 1/2004 | Takasumi et al. | 348/207.99 |
| 2005/0046729 | A1 | 3/2005 | Taguchi et al. | |

FOREIGN PATENT DOCUMENTS

CN 1427293 A 7/2003

(Continued)

OTHER PUBLICATIONS

T. Ida, et al., IEEE Transactions on Image Processing, vol. 9, No. 11, pp. 1926-1936, "Self-Affine Mapping System and Its Application to Object Contour Extraction", Nov. 2000.

(Continued)

*Primary Examiner*—Timothy J Henn
(74) *Attorney, Agent, or Firm*—Oblon, Spivak, McClelland, Maier & Neustadt, P.C.

(57) ABSTRACT

An image-processing apparatus comprising: an image pickup device for taking pictures of subjects, thereby creating first and second subject images; an image combining unit for overlaying said first subject image with a partially-transparent image set with a transparent region, thereby creating a composite image; a display for displaying the composite image thus created; a memory for storing the second subject image; and a transparent-region setting unit for setting a transparent region in a part of the second subject image stored in the memory, thereby creating the partially-transparent image.

5 Claims, 17 Drawing Sheets

FOREIGN PATENT DOCUMENTS

| | | | |
|---|---|---|---|
| CN | 1427619 A | 7/2003 |
| JP | 10-107999 | 4/1998 |
| JP | 2000-78501 | 3/2000 |
| JP | 2001-333327 | 11/2001 |
| JP | 2002-118803 | 4/2002 |
| JP | 2002-320086 | 10/2002 |
| JP | 3484984 | 10/2003 |

OTHER PUBLICATIONS

M. Kass, et al., Proc. 1st Int. Cof. on Computer Vision, pp. 259-268, "Snakes: Active Contour Models", 1987.
U.S. Appl. No. 10/890,175, filed Jul. 14, 2004, Taguchi et al.
U.S. Appl. No. 11/019,377, filed Dec. 23, 2004, Taguchi et al.
U.S. Appl. No. 09/512,805.
U.S. Appl. No. 09/692,457, filed Oct. 20, 2000, Ida et al.
U.S. Appl. No. 09/911,474, filed Jul. 25, 2001, Ida et al.
U.S. Appl. No. 10/391,806, filed Mar. 20, 2003, Matsumoto et al.
U.S. Appl. No. 10/610,563, filed Jul. 2, 2003, Ida et al.
U.S. Appl. No. 10/638,806, filed Aug. 12, 2003, Matsumoto et al.
U.S. Appl. No. 10/664,878, filed Sep. 22, 2003, Takeshima et al.
U.S. Appl. No. 10/890,175, filed Jul. 14, 2004, Taguchi et al.
U.S. Appl. No. 12/041,212, filed Mar. 3, 2008, Matsumoto et al.
U.S. Appl. No. 12/041,247, filed Mar. 3, 2008, Matsumoto et al.
U.S. Appl. No. 11/396,466, filed Apr. 4, 2006, Ida et al.

* cited by examiner

FIG. 9
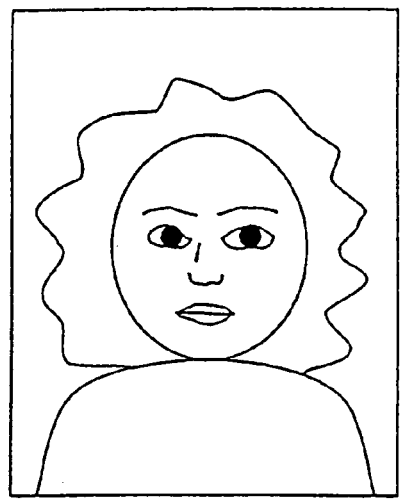
FIG.10A  FIG.10B  FIG.10C
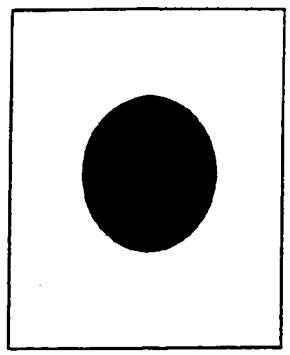 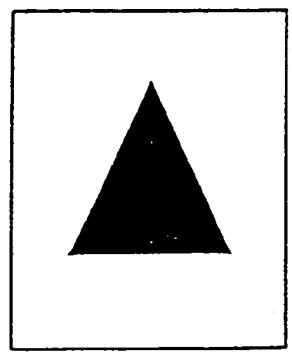 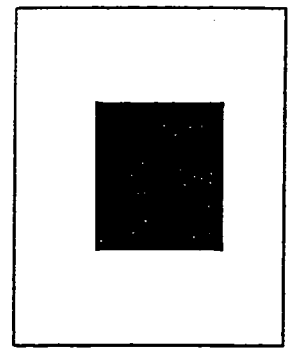

APPARATUS AND METHOD FOR PROCESSING A PHOTOGRAPHIC IMAGE USING A STENCIL

CROSSREFERENCE TO RELATED APPLICATIONS

This application is based upon and claims the benefit of priority from the prior Japanese Patent Application No. 2003-305509, filed on Aug. 28, 2003; the entire contents of which are incorporated herein by reference.

TECHNICAL FIELD

The present invention relates to an image-processing apparatus and method, for combining a partially-transparent image with an image of a photographic subject taken by a camera mechanism, so that the partially-transparent image is superimposed on the image of the subject; as to display a composite image on a cellular telephone, PHS, personal digital assistant having such camera mechanism.

BACKGROUND OF THE INVENTION

Recently, there are photoprint amusement apparatuses set up at game centers and tourist spots. The photoprint amusement apparatus is to combine, by superimposition, a subject image with a pre-set image called the picture-frame image or stamp image, thereby making a photoprint of a composite image (Japanese Patent Disclosure 2000-78501A).

The picture-frame or stamp image is set previously with a transparent region. The image previously provided with a transparent region is referred to as a partially-transparent image. For example, in case a partially-transparent image shown in FIG. 28 is superimopsed on a photographic image shown in FIG. 15, then obtained is a resultant image as shown in FIG. 29. With such combining, it is possible to obtain such a composite image that could not be obtained by merely taking a picture of the subject.

However, in the prior art, the partially-transparent image utilizable for combining is limited to the partially-transparent image prepared previously in the apparatus or the partially-transparent image acquired through the network, hence being limited in varieties and kinds. Thus, users not always obtain a composite image they desire.

It is intended to provide an apparatus and method for processing a photographic image which allows for creating a variety of composite images, on the electronic appliances, such as the cellular telephone having a camera function.

BRIEF SUMMARY OF THE INVENTION

One aspect of the present invention is an apparatus for processing a photographic image, comprising: an image pickup device for taking pictures of subjects, thereby creating first and second subject images; an image combining unit for overlaying said first subject image with a partially-transparent image set with a transparent region, thereby creating a composite image; a display for displaying the composite image thus created; a memory for storing the second subject image; and a transparent-region setting unit for setting a transparent region in a part of the second subject image stored in the memory, thereby creating the partially-transparent image.

With this aspect of the invention, a partially-transparent image can be created from a taken subject image. Because the partially-transparent image is not limited to those previously prepared in the apparatus or those acquired through the network, it is possible to obtain a composite image the user desires.

Another aspect of the invention is an apparatus for processing a photographic image, comprising: a plurality of image pickup devices for taking pictures of in respective different directions; and a multiple-display implementing unit for taking one of two images respectively taken pictures of by the two of the plurality of image pickup devices as a first image and the other as a second image, setting a region having a predetermined shape in a display area of the display device, and displaying simultaneously the first image in an interior of the region and the second image in an exterior of the region.

With this aspect of the invention, by taking first and second images by respective image pickup devices, the first and second images are displayed simultaneously and respectively at exterior and interior of said region, on a screen of a display. Accordingly, it is possible to create an image as if the first and second images exist in the same place.

BRIEF DESCRIPTION OF THE DRAWINGS

FIG. 9 is a friend face image;

FIGS. 10A-10C are explanatory views concerned with shapes of stencil patterns including an ellipse and a convex polygon;

DETAILED DESCRIPTION OF THE INVENTION

Figure 1:
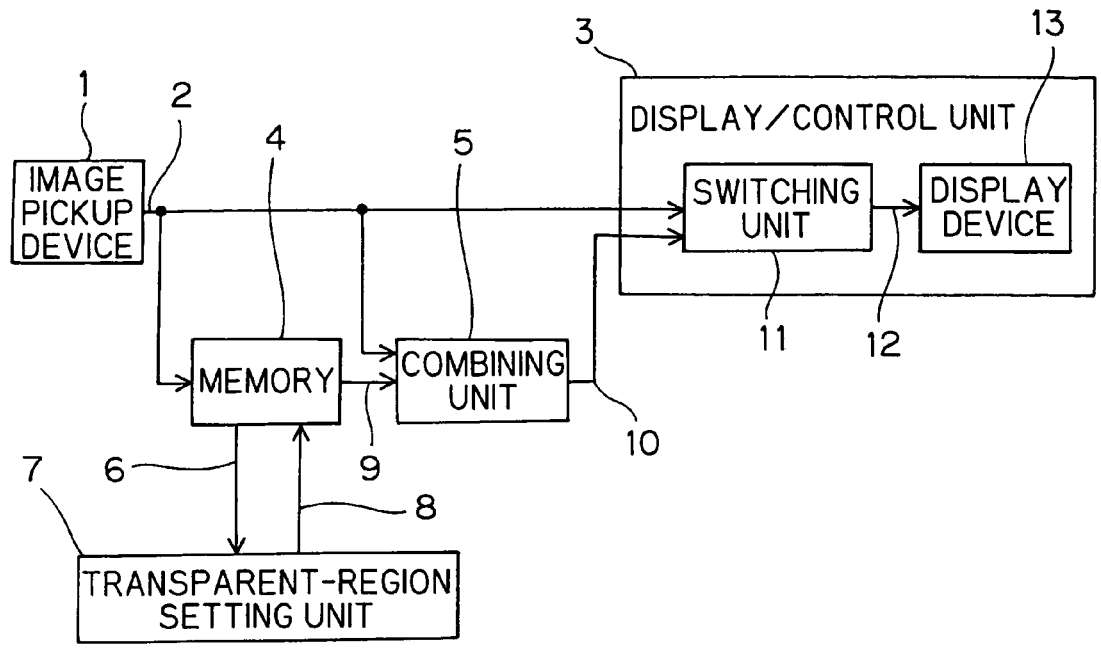
FIG. 1 is a block diagram showing an arrangement of a photographic image processing apparatus concerned with a first embodiment of the present invention.

Now, embodiments of the present invention will be explained while referring to the drawings.

First Embodiment

A first embodiment of the invention is explained based on FIGS. 1 to 5.

(1) Arrangement of Photographic Image Processing Apparatus

FIG. 1 is a block diagram showing an arrangement of a photographic image processing apparatus concerned with the present embodiment.

An image pickup device 1 takes a picture of a photographic subject. This provides a subject image signal 2 to be sent to a display/control unit 3, a memory 4 and a combining unit 5. Note that the image pickup device 1 is a CCD camera or CMOS camera capable of outputting image signals, for example.

The memory 4 stores the subject image signal 2. Note that the memory 4 herein is a RAM or hard disk, for example. The subject image signal 2 stored in the memory 4 is sent as a subject image signal 6 to a transparent-region setting unit 7.

The transparent-region setting unit 7 sets a transparent region in the subject image signal 6. This provides a partially-transparent image signal 8 to be sent to the memory 4. The memory 4 stores the partially-transparent image signal 8. The partially-transparent image signal 8 saved in the memory 4 is sent, as then designated as a partially-transparent image signal 9, to the combining unit 5.

The combining unit 5 superimposes a partially-transparent image represented by the partially-transparent image signal 9 over a subject image to be combined as represented by the subject image signal 2. This provides a composite image to be sent as a composite image signal 10 to the display/control unit 3.

The display/control unit 3 sends the subject image signal 2 and composite image signal 10 to a switching unit 11.

The switching unit 11 selects any one of the subject image signal 2 and the composite image signal 10, and sends a selected signal as a display image signal 12 to a display device 13.

The display device 13 displays an image represented by the display image signal 12. The display device 13 herein is a liquid-crystal display.

Note that the other arrangements and functions than the image pickup device 1 and display device 13 are to be realized by the program stored on the computer.

(2) Process Flow in Photographic Image Processing Apparatus

Figure 2:
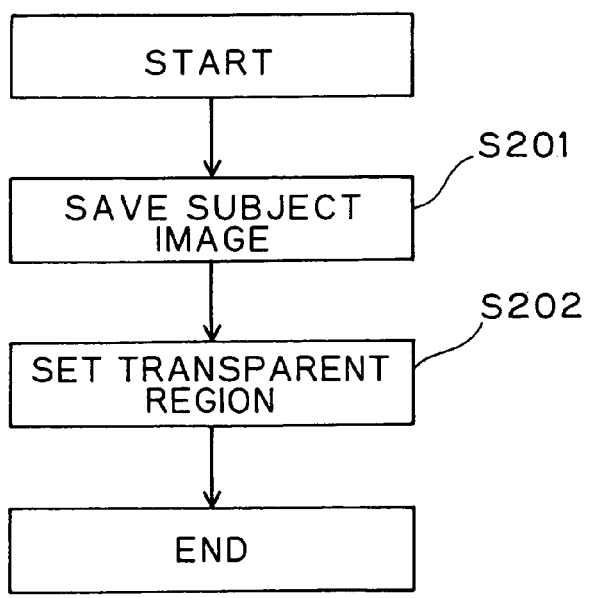
FIG. 2 is a flowchart showing a process flow of a photographic image processing method concerned with the present embodiment.

FIG. 2 is a flowchart showing a process flow in the present embodiment.

At first, an image for the user to create a partially-transparent image is taken by the image pickup device 1. It is herein assumed that a starry sky is being taken a picture of.

Then, the image of a starry sky under shooting is displayed on the display device 13.

Subsequently, picture-taking of the starry sky is terminated according to a user's instruction, and the image of the starry sky taken immediately before ending the shooting is saved to the memory 4. The process heretofore corresponds to S201.

Figure 3:
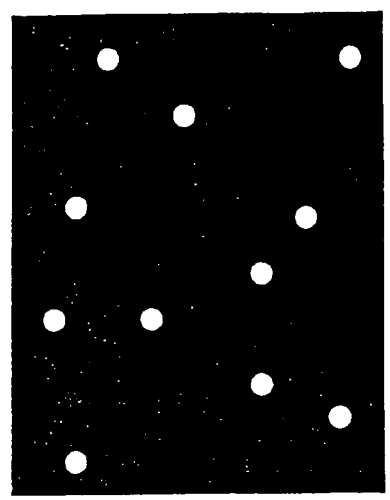
FIG. 3 is an image of a starry sky.
Figure 4:
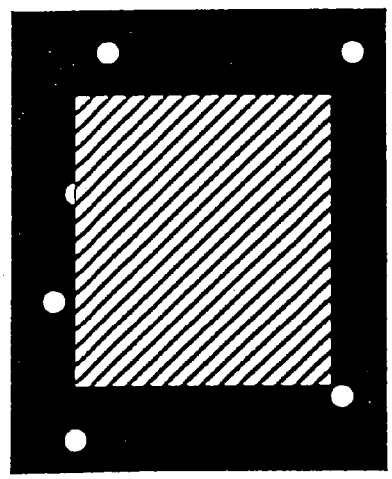
FIG. 4 is a partially-transparent image that the image of FIG. 3 is set with a transparent region.

Simultaneously with the user's instruction, the saved image of the starry sky is displayed on the display device 13. FIG. 3 depicts a status that the saved image of the starry sky is on display. In the saved image of the starry sky, a predetermined region is set as a transparent region. The predetermined region herein is assumed as a rectangular positioned in the center of the image. FIG. 4 depicts a partially-transparent image of the starry sky set with the transparent region. Note that, in FIG. 4, the hatched area represents the transparent region. The process of up to setting the transparent region corresponds to S202.

The image set with the transparent region is saved as a partially-transparent image in a form supporting the transparency. There are known the PNG and GIF formats as forms to support transparency.

Finally, the partially-transparent image is displayed on the display device 13 while being combined with a subject image that is currently taken a picture of by the camera as to be fitted in the transparent region. Thereupon, the user is allowed to take a picture of the subject image to be combined in accordance of his or her desire or preference, and to view a composite image the partially-transparent image is combined as to be superimposed over the subject-of-combining image.

Figure 5:
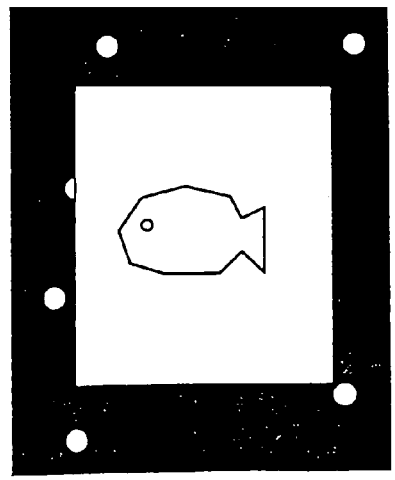
FIG. 5 is a composite image where the partially-transparent image of FIG. 4 is superimposed over a fish photographic image.

For example, FIG. 5 depicts a composite image obtained by combining the partially-transparent image of starring sky of FIG. 4 as to be superimposed over a subject image the user has taken a picture of a fish swimming within a water tank. In this case, the partially-transparent image of starring sky serves as a picture-frame image or surrounding image.

Incidentally, the partially-transparent image may be a still image or a moving image.

Meanwhile, the subject image to be laid under a partially-transparent image may be a still image or a moving image.

In this manner, the present embodiment can create various partially-transparent images from a shot image.

Second Embodiment

A second embodiment of the invention is explained based on FIGS. 6 to 22 and 25.

(1) Arrangement of Photographic Image Processing Apparatus

Figure 6:
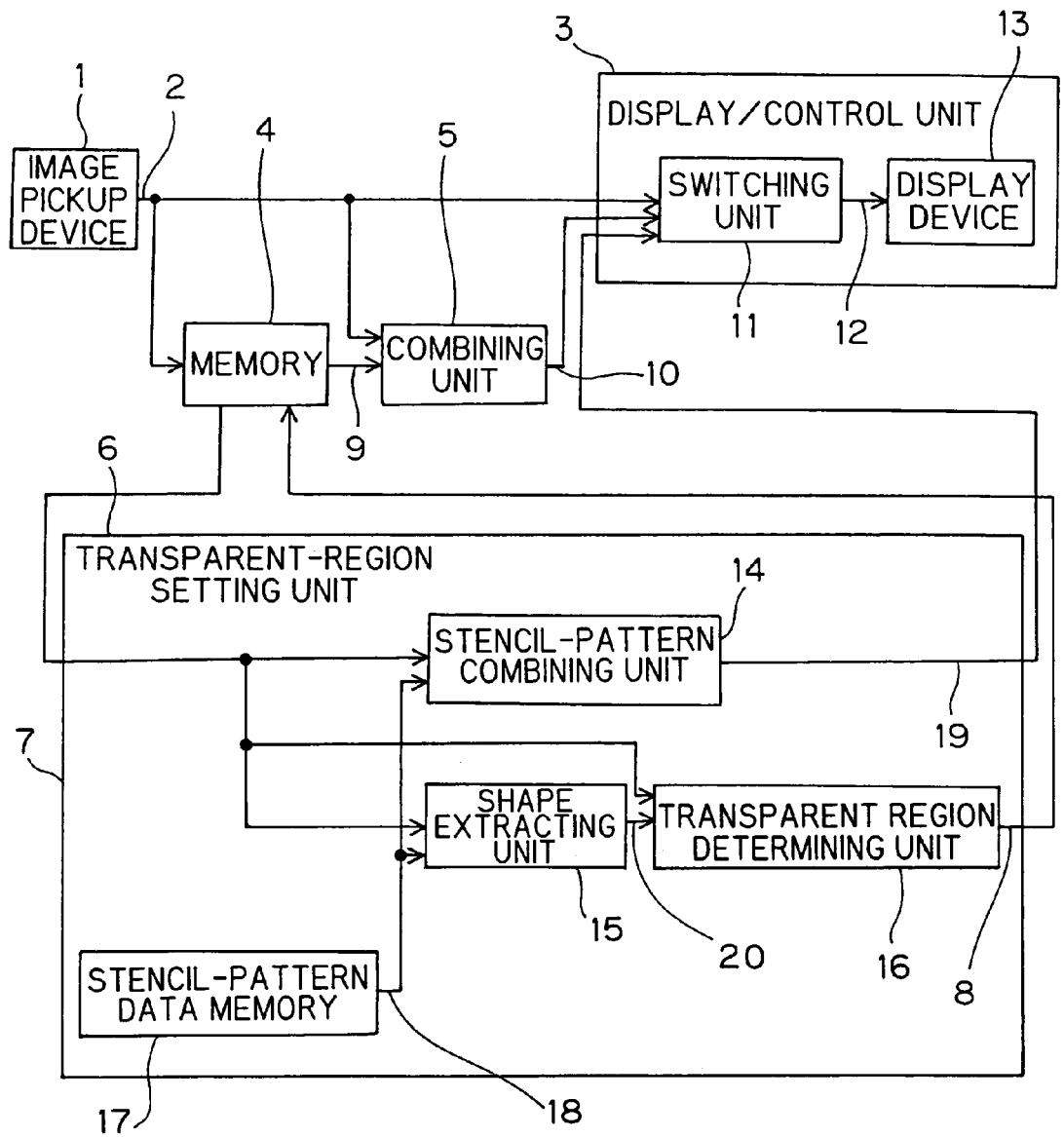
FIG. 6 is a block diagram showing an arrangement of a photographic image processing apparatus concerned with a second embodiment of the present invention.

FIG. 6 is a block diagram showing an arrangement of a photographic image processing apparatus concerned with the present embodiment.

In FIG. 6, the transparent-region setting unit 7 of FIG. 1 is configured by a stencil-pattern combining unit 14, a shape extracting unit 15, a transparent-region determining unit 16 and a stencil-pattern data memory 17. The units or elements same as those of FIG. 1 are omitted of explanation, to make an explain only on those added.

The transparent-region setting unit 7 sends the subject image signal 6 to the stencil-pattern combining unit 14, the shape extracting unit 15 and the transparent-region determining unit 16.

The stencil-pattern data memory 17 is stored with data of a plurality of stencil patterns, one of which is sent as a stencil-pattern data signal 18 to the stencil-pattern combining unit 14 and shape extracting unit 15. The stencil-pattern data memory 17 herein is a ROM or a RAM, for example.

The stencil-pattern combining unit 14 combines a stencil pattern represented by a stencil-pattern data signal 18 with an image represented by the subject image signal 6, so that the stencil pattern is superimposed over the image. This provides a stencil-pattern composite image signal 19 to be sent to the display/control unit 3.

The shape extracting unit 15 extracts a contour or other shape in a part of the subject, out of the subject image signal 6 and stencil-pattern data signal 18, and sends the shape as a shape data signal 20 to the transparent-region determining unit 16.

For the image represented by the subject image signal 6, the transparent-region determining unit 16 determines an interior of a shape represented by the shape data signal 20 as a transparent region, thereby sending a partially-transparent image signal 8 on a partially-transparent image set with a transparent region to the memory 4.

To the display/control unit 3, the stencil-pattern-composite image signal 19 is sent besides the subject image signal 2 and composite-image signal 10 as was sent in the arrangement of FIG. 1. Those are sent to the switching unit 11. The switching unit 11 selects any signal of those, and sends a selected signal as a display image signal 12 to the display device 13.

(2) Process Flow in the Photographic Image Processing Apparatus

Figure 7:
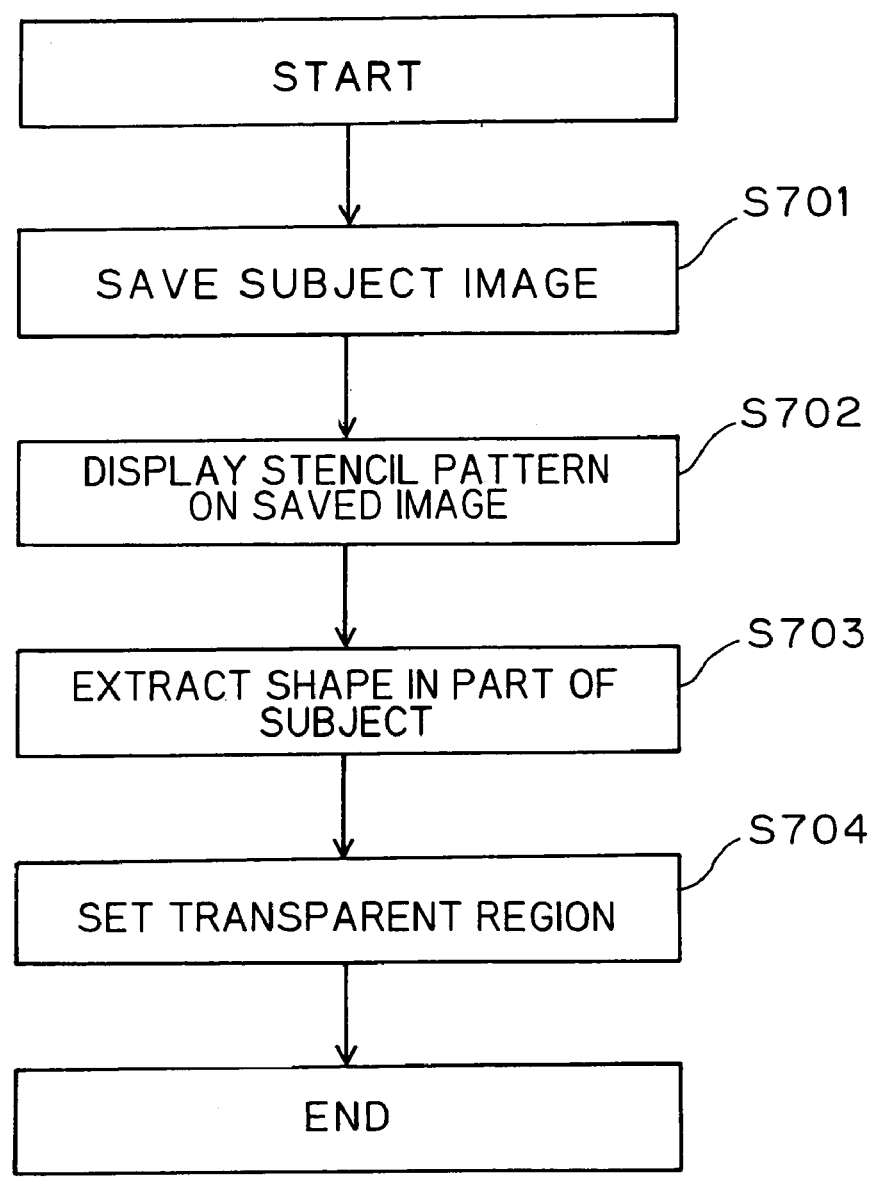
FIG. 7 is a flowchart showing a process flow of a photographic image processing method concerned with the present embodiment.

FIG. 7 is a flowchart showing a process flow in the present embodiment.

At first, the image pickup device 1 takes a picture of a subject, a photographic image of which is displayed on the display device 13.

Then, shooting the subject is terminated according to a user's instruction, to store the image taken immediately before ending the shooting to the memory 4. The process heretofore corresponds to S701.

Then, the image stored in the memory 4 is displayed on the display device 13.

Next, the stencil-pattern combining unit 14 combines a stencil pattern having a predetermined shape, with an image being displayed; so that on the image the stencil pattern is superimposed at a predetermined size and position. On such combining, the interior of the stencil pattern is filled with solid coloration in a single color. An image combined with the stencil pattern is displayed on the display device 13. The process heretofore corresponds to S702.

Then, the shape extracting unit 15 extracts a shape or an outline in a part of the subject, out of the subject image and the stencil pattern on display. In extracting a shape in a part of the subject, used is the fractal contour extraction method (T. Ida and Y. Sambonsugi, "Self-Affine Mapping System and Its Application to Object Contour Extraction" IEEE Trans. Image Processing, Vol. 9, No. 11, pp. 1926-1936, November 2000.) or Snakes (M.Kass, A.Witkin, and D.Terzopouls, "Snakes: Active contour models," in Proc. 1st Int. Conf. on Computer Vision, pp. 259-268, 1987). In such a manner, a shape in a part of the subject is extracted to produce the partially-transparent image in accordance with the intention of the user. The process heretofore corresponds to S703.

Finally, in the stored subject image, the transparent-region determining unit 16 determines a region within the shape extracted from a part of the subject as to be transparent, thereby setting up a transparent region. This process corresponds to S704.

The subject image set with a transparent region is stored as a partially-transparent image, in order for utilization in combining.

(3) Concrete Example

A concrete example using the photographic image processing apparatus of this embodiment is explained on a process flow: starting from creating a partially-transparent image out of the image the user has shot his/her friend; up to combining the partially-transparent image with a subject image taken a picture of himself/herself so that the partially-transparent image is superimposed over the subject image.

Figure 8:
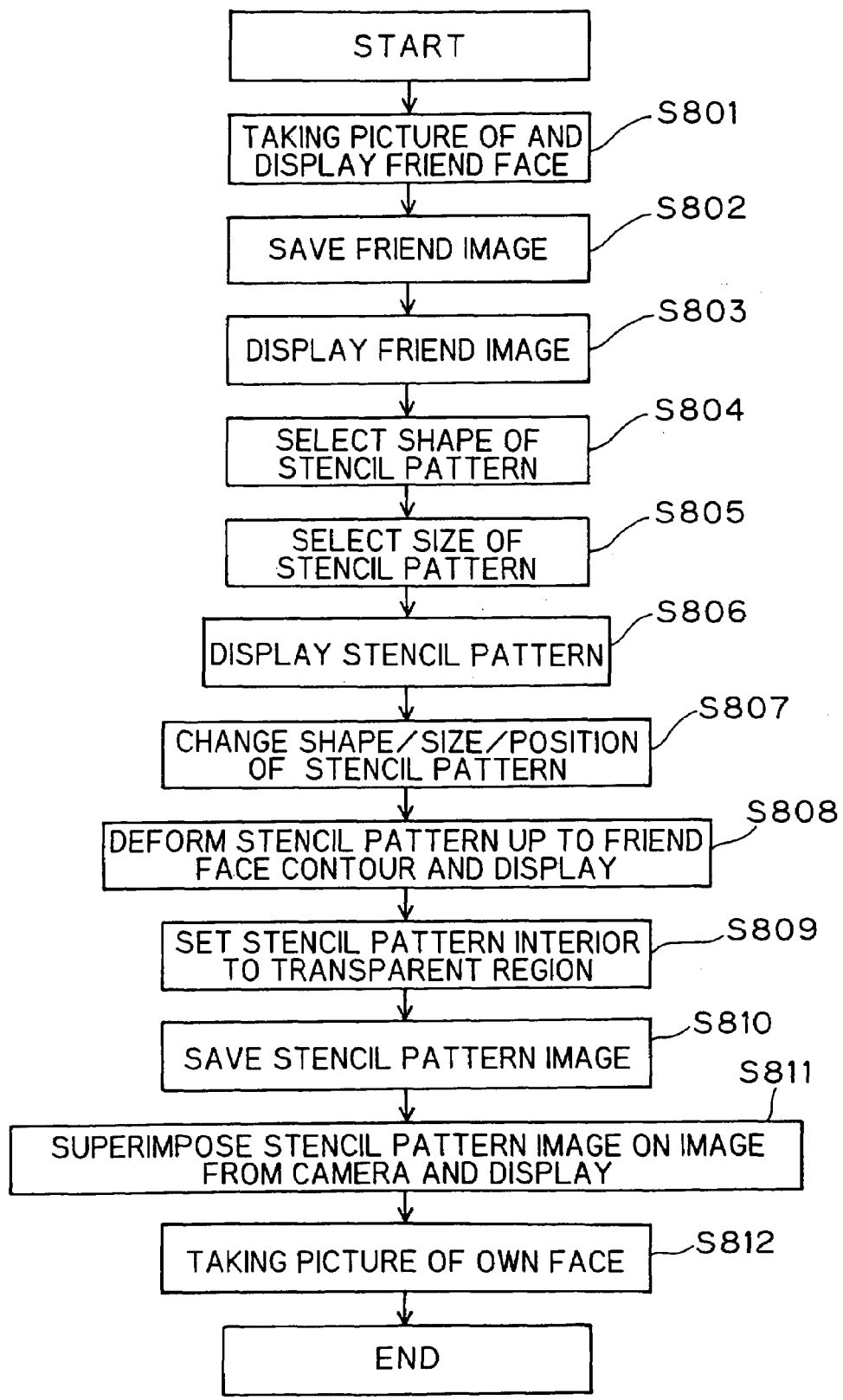
FIG. 8 is a flowchart showing a process flow in a case to combine a friend image with the front of one's own image according to the present embodiment.

FIG. 8 is a flowchart showing the process flow.

Figure 25:
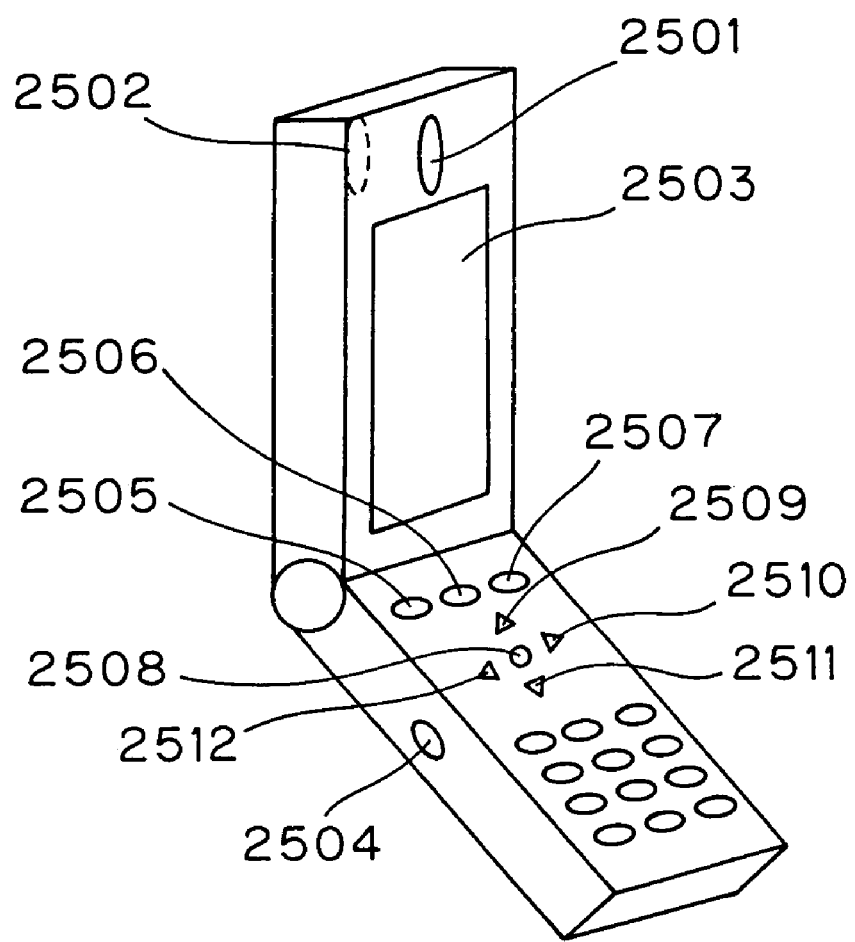
FIG. 25 is a view of a cellular telephone equipped with a camera or cameras.

It is herein assumed that the user uses a cellular telephone equipped with camera shown in FIG. 25.

At first, when the user directs a camera 2502 toward his/her friend and takes a picture of the friend's face, a photographic image of which is displayed on the display 2503 (S801).

Then, when the user presses the button 2504 or 2508, imaging of the friend is terminated to store a friend image taken immediately before ending the imaging (S802).

Next, the stored image is displayed on the display 2503 (S803). FIG. 9 represents a friend face image stored and on display.

Then, a shape of the stencil pattern is selected from a plurality of candidates, by the user (S804). The candidates of the shape of stencil pattern may include an ellipse or oval shown in FIG. 10A, a triangle shown in FIG. 10B, a rectangle or square shown in FIG. 10C and the like.

Figure 11:
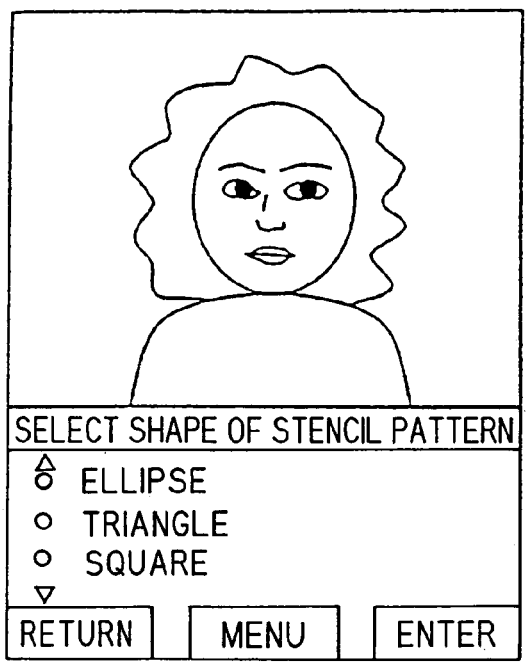
FIG. 11 is an explanatory view showing a manner allowing the user to select a shape of the stencil pattern.

FIG. 11 is an explanatory figure showing a manner of selecting a shape of the stencil pattern by the user.

In FIG. 11, the word "ellipse" is displayed with emphasis. When the user pushes the buttons 2509 and 2511, the word on emphatic display changes between "ellipse", "triangle" and "rectangle". Pressing the button 2505 or 2512 brings the process back to the former. If the button 2507 or 2508 is pressed, selected is a shape of the stencil pattern corresponding to the word displayed with emphasis. Then, a size of the stencil pattern is selected out of "large", "middle" and "small" (S805)

Figure 12:
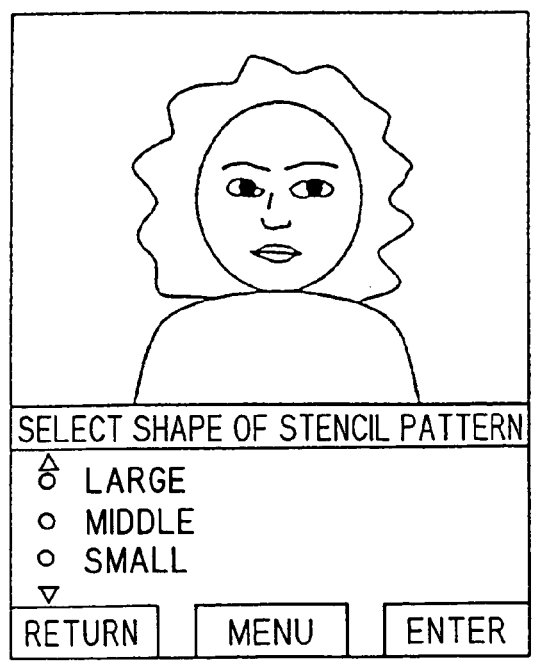
FIG. 12 is an explanatory view showing a manner allowing the user to select a size of the stencil pattern.

FIG. 12 is an explanatory view showing a manner of selecting a size of the stencil pattern by the user.

In FIG. 12, the word "middle" is emphatically displayed. When the user presses the button 2509 or 2511, the word on emphatic display changes between "large", "medium" and "small". Pressing the button 2505 or 2512 brings the process back to the former. Pressing the button 2507, 2508 or 2510 selects a size of the stencil pattern corresponding to the word being emphatically displayed.

Then, in front of the friend face image being displayed, displayed is the selected shape of the stencil pattern in a selected size and position in a state the the stencil pattern interior colored-solid in a single color (S806).

Next, the user modifies the shape, size and position of the stencil pattern such that, of the friend face image on display, the face region excepting the hair is just covered by the stencil pattern (S807).

Figure 13:
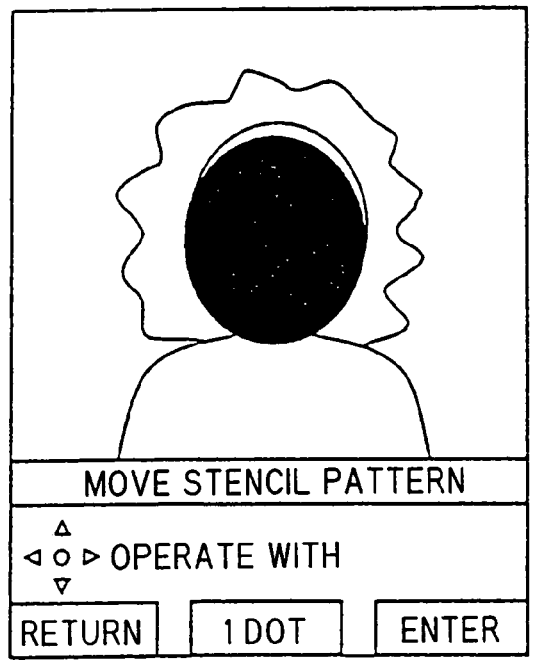
FIG. 13 is an explanatory view showing a manner allowing the user to change a position of the stencil pattern.

FIG. 13 is an explanatory view showing a manner that the position of the stencil pattern is changed by the user.

The ellipse depicted in solid black in FIG. 13 represents the stencil pattern. When the user presses the arrowhead buttons

2509-2512, the stencil pattern moves up, down, left, and right. In FIG. 13, the stencil pattern moves by a distance of 1 dot per one pressing of the arrowhead buttons. In case the user presses the button 2506, shift amount of the stencil pattern per one pressing is changed. When the button 2506 is pressed once, shift amount per one pressing is increased to a distance of 5 dots. By pressing it once more, shift amount per one pressing is increased to a distance of 10 dots. By pressing it once furthermore, shift amount per one pressing becomes a distance of 1 dot again. The movement of the stencil pattern may be restricted to a certain range as to prevent part of the stencil pattern from extending out of the friend face being displayed. Pressing the button 2505 bring the process back to the former. By pressing the button 2507 or 2508, stencil pattern movement is ended.

Next, the fractal contour extracting method or Snakes noted before is used. Starting from the friend image and the stencil pattern now on display, the stencil pattern is deformed to agree with the contour of the friend's face excepting the hair, as to display the image with the deformed stencil pattern (S808).

Then, the interior of the deformed stencil pattern, i.e. solid colored part with a single color, is set as a transparent region (S809).

Figure 14:
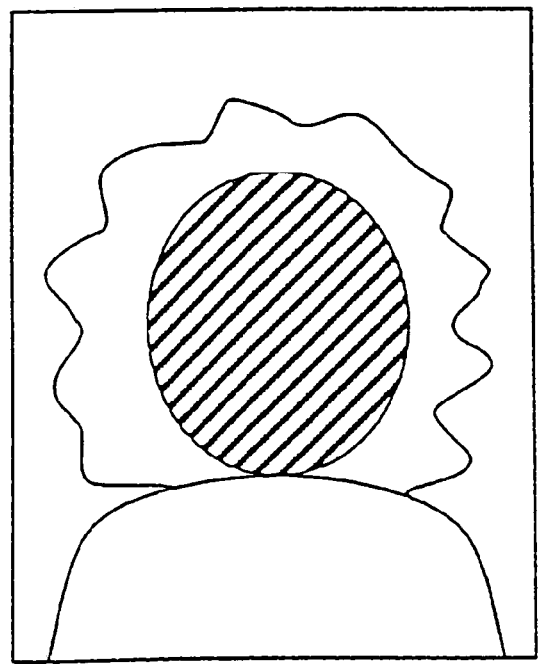
FIG. 14 is a partially-transparent image created from the image of FIG. 9.

The resultant image is stored as a partially-transparent image (S810). The partially-transparent images may be stored in a particular folder separated from the images other than those. At S807, the friend face region excepting the hair is just covered, and at S808 the contour shape of the face region excepting the hair is extracted. The partially-transparent image stored is made as an image that the friend face region excepting the hair is clipped out of the friend image into hollow. The partially-transparent image is shown in FIG. 14. Note that the hatched area represents the transparent region. When to display only the partially-transparent image on the display 2503 as in FIG. 14, it is preferred that the hatched area of the transparent region is filled with a solid and single color.

Then, the partially-transparent image is displayed while being embedded in the transparent region with a subject image taken by the camera 2501 (S811).

Figure 15:
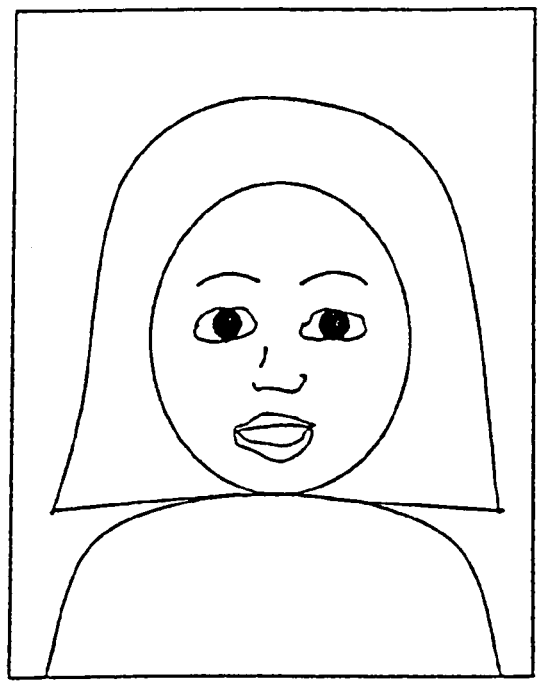
FIG. 15 is an image of one's own.
Figure 16:
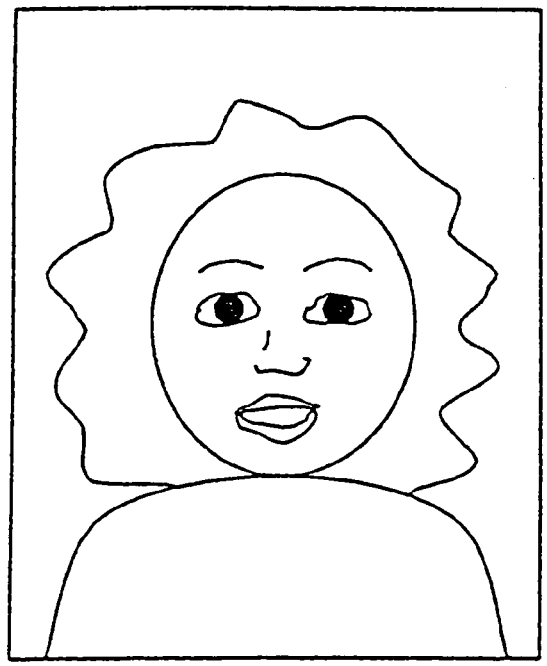
FIG. 16 is an image that the partially-transparent image of FIG. 14 is superimposed over the image of FIG. 15.

Finally, the user direct the camera 2501 toward him/her. By overlapping his/her face region excepting the hair with the transparent region, his/her face is taken a picture of (S812). Thereupon, displayed is an image of his/her face composite with the friend's hairstyle. FIG. 15 shows his/her image to be laid under the partially-transparent image, while FIG. 16 shows the resultant composite image. The resultant composite image is given as an image of a person having the friend's hairstyle and his/her own face.

Incidentally, the process at S801 and S802 of FIG. 8 corresponds to the process at S701 of FIG. 7.

The process at S803-S807 corresponds to the process at S702. The process at S808 corresponds to the process at S703. The process at S809 corresponds to the process at S704.

(4) Modifications to the Concrete Example Modifications to the above embodiments are explained in the below.

(4-1) Modification 1 to S804

The stencil pattern to be selected at S804 does not have to be limited to those shown in FIG. 10. The patterns shown in FIGS. 17A-17I and other patterns may be adopted. With such various adoptable shapes of the stencil patterns, partially-transparent image can be created with greater versatility.

Figure 17A:
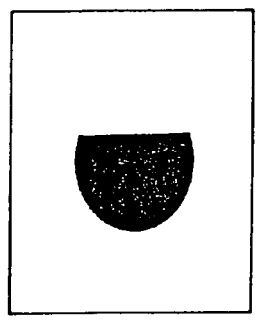
FIGS. 17A-17J are explanatory views concerned with the other shapes of stencil patterns than an ellipse and a convex polygon.

The shape of FIG. 17A is effective in creating a partially-transparent image from a bang-haired face image.

Figure 17B:
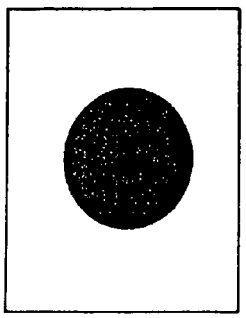

The shape of FIG. 17B is effective in creating a partially-transparent image from a face image of a round-faced person.

Figure 17C:
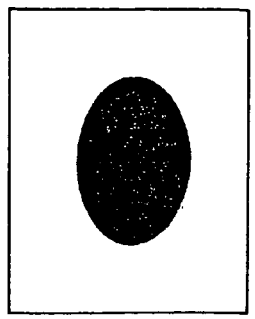

The shape of FIG. 17C is effective in creating a partially-transparent image from a face image of a long-faced person.

Figure 17D:
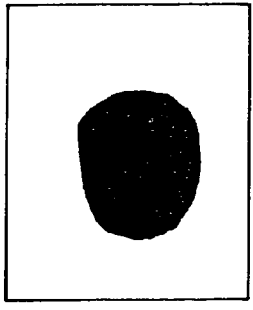

The shape of FIG. 17D is a stored stencil pattern resulted by deformation at S808 when a partially-transparent image has been created in the past from an image of a certain person; which is effective in again creating a partially-transparent image from a face image of the same person.

Figure 17E:
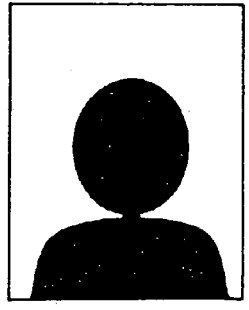

The shape of FIG. 17E is effective in creating a partially-transparent image from an image of a person in a region of the shoulder and above.

Figure 17F:
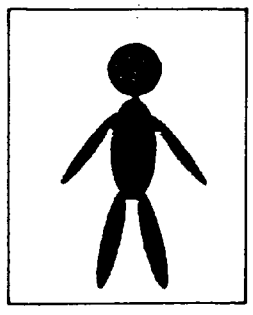

The shape of FIG. 17F is effective in creating a partially-transparent image from a full-length image of a person.

Figure 17G:
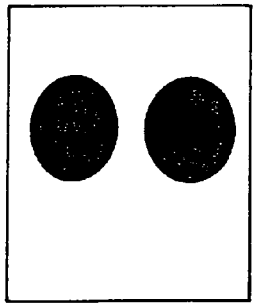
Figure 17H:
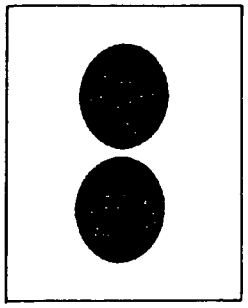
Figure 17I:
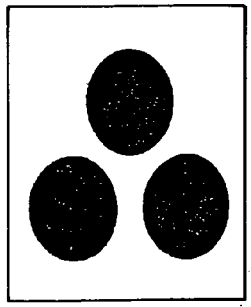

The shapes of FIG. 17G-17I are effective in creating a partially-transparent image from the face image of a plurality of persons.

(4-2) Modification 2 to S804

When the user selects a shape of the stencil pattern at S804, he/she does not have to select a word corresponding to the shape.

For example, at first, an elliptic stencil pattern in a predetermined position and size is displayed as superimposed over an image from the camera 2502 as a composite image.

Then, the shape of stencil pattern as superimposed and displayed is changed by user's pressing of the button 2509 or 2511.

Finally, a shape of the stencil pattern is set by user's pressing of the button 2508.

By doing so, the user is allowed to select a shape of the stencil pattern even when the alternatives are not displayed in words. In case this is applied to S805, the user is allowed to select a size of the stencil pattern even if the alternatives are not displayed in words.

(4-3) Modification to S806

At the S806, the stencil pattern may be displayed by a dotted line.

Regardless of that a stencil pattern is displayed by a dotted line or by solid coloring with a single color, preferably the user is allowed to select a color of the stencil pattern on display.

Figure 17J:
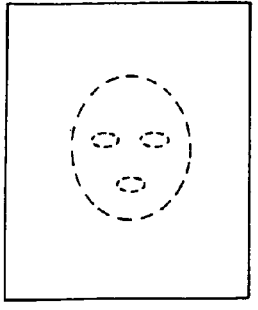

In the case the stencil pattern is displayed by a dotted line, the shape shown in FIG. 17J may be used at S804. The shape of FIG. 17J is one the human feature of eyes and mouth are added to the interior of the stencil pattern. Due to the addition of the eyes and mouth, it is easy to take a picture of a person from the front. In deforming the stencil pattern at S808, only the information of stencil pattern is used to extract a face shape excepting the hair.

(4-4) Modification to S807

At S807, the stencil pattern may be rotated, enlarged and contracted, or enlarged and contracted only vertically or only horizontally.

Besides the stencil pattern, the friend image may be modified in size or position.

Meanwhile, the friend image may be rotated, enlarged and contracted, or enlarged and contracted only vertically or only horizontally.

(4-5) Modification to S808

At S808, where it takes a time in processing for stencil pattern deformation, a message may be displayed to notify the user of that fact.

For example, it is preferred to display "Wait a minute". It is also preferred to display a time in ending the process. For the other processes, the similar devising is feasible where it takes a time.

(4-6) Modification to S809

At S809, a transparent region may be set in the exterior of the stencil pattern instead of interior thereof.

Figure 18:
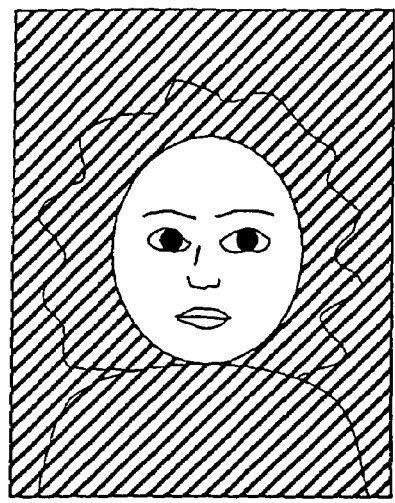
FIG. 18 is a partially-transparent image created from the image of FIG. 9 in the case exterior of the stencil pattern is set as a transparent region.

In such a case, the partially-transparent image is given as an image that, of the friend image, the face region excepting the hair is left while the other part is a transparent region. The partially-transparent image is shown in FIG. 18. Note that the hatched area represents a transparent region.

Concerning the partially-transparent image, storage may be only for the minimum rectangular region surrounding the part not constituting a transparent region.

After creating a partially-transparent image set with a transparent region in the stencil pattern's exterior, the user is allowed to paste the partially-transparent image just like as a stamp to the front of the image saved in a separate file. By combining the partially-transparent image with the image saved in the file, a versatility of composite images are available.

Figure 19:
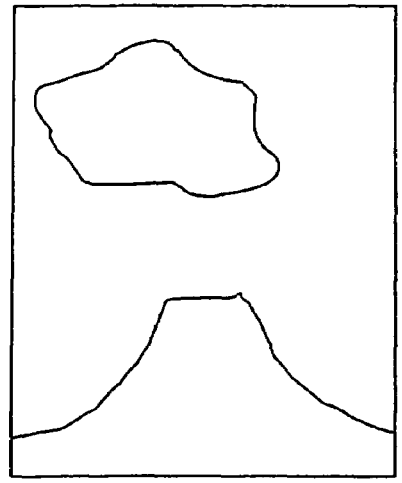
FIG. 19 is a mountain image.
Figure 20:
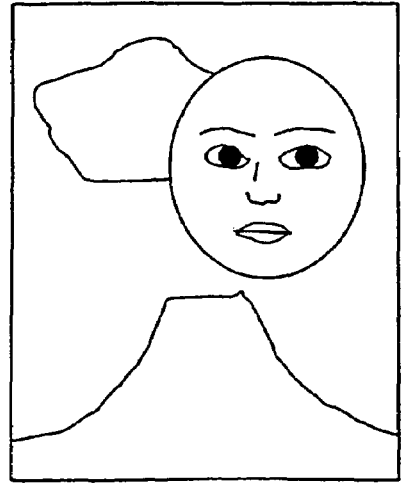
FIG. 20 is an image that the partially-transparent image of FIG. 18 is superimposed over the image of FIG. 19.

There is shown in FIG. 20 an image that the partially-transparent image of FIG. 18 is superimposed over a mountain image shown in FIG. 19. Here, in case the part of the partially-transparent image of FIG. 18 not set as a transparent region is set as a semitransparent region, the resultant image is an image like so-called a psychic photograph.

The user is allowed to paste the partially-transparent image just like as a stamp to an e-mail text.

Figure 21:
FIG. 21 is an explanatory view showing the text of an e-mail.
Figure 22:
FIG. 22 is an image that the partially-transparent image of FIG. 18 is superimposed over the e-mail text of FIG. 21.

FIG. 22 shows an image having the e-mail shown in FIG. 21 pasted with the partially-transparent image of FIG. 18.

(4-7) Modification to S811

At S811, a mirror inversion may be displayed of a partially-transparent image and image of from the camera 2501.

The present embodiment showed the example that a partially-transparent image was prepared by displaying a stencil pattern for a saved image and extracting a shape of a subject part. This example required to move the stencil pattern meeting a part of the subject or to change the stencil pattern size. On the other hand, it is possible to take a picture of a subject while displaying a stencil pattern. If doing so, because the user can take a picture of the subject as to fall in with the stencil pattern, there is no necessity to move the stencil pattern and change the stencil pattern's size.

(4-8) Modifications

The present embodiment showed the example of combining an image of a person having own face wearing his/her friend hairstyle. Naturally, other various composite images can be created.

For example, for the image the user has taken a picture of himself/herself with a certain landscape during a trip, he/she may set the part of his/her portrait as a transparent region, thereby preparing a partially-transparent image. Then, in case a friend image is shot in a manner matched to a transparent region of the partially-transparent image, image combining is effected as if the friend had made a journey to the site and taken a picture thereof.

Third Embodiment

Figure 23:
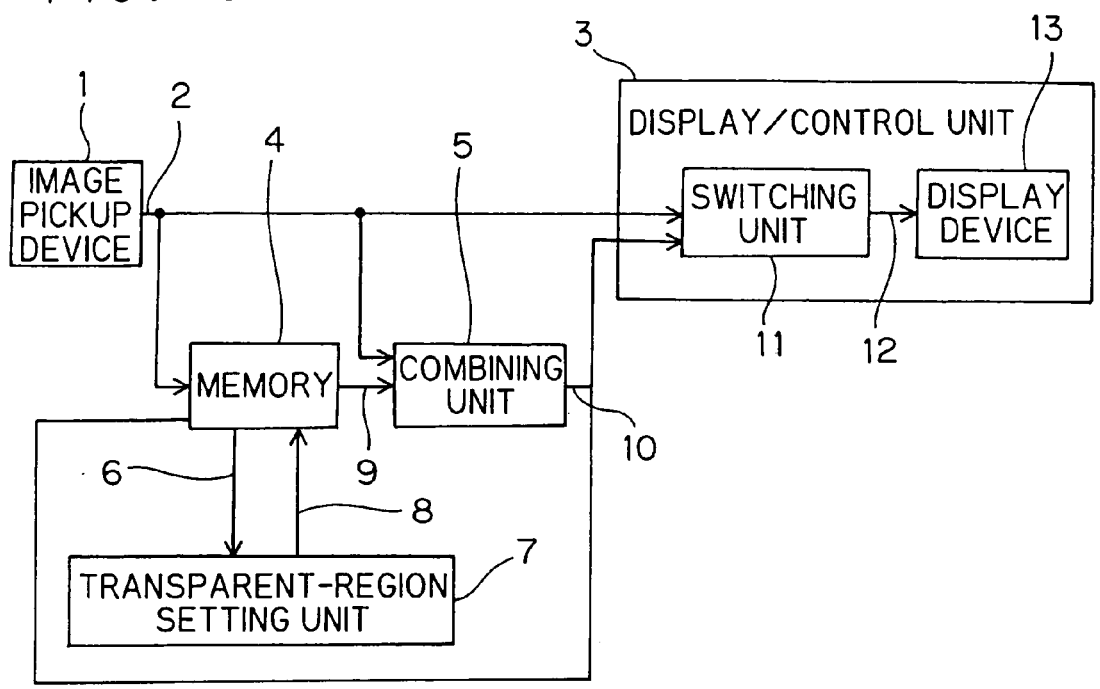
FIG. 23 is a block diagram showing an arrangement of a photographic image processing apparatus concerned with a third embodiment of the present invention.
Figure 24:
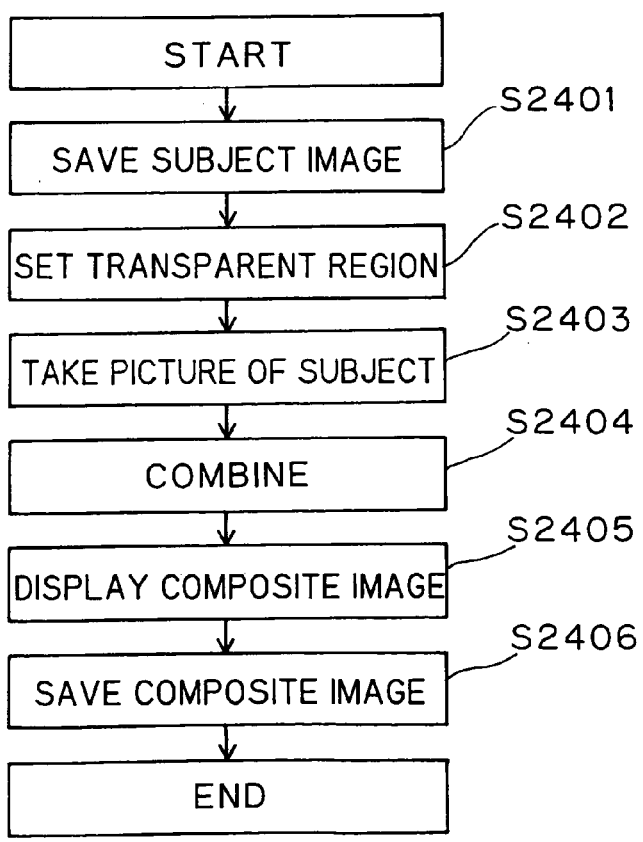
FIG. 24 is a flowchart showing a process rough flow of a photographic image processing method concerned with the present embodiment.

A third embodiment of the invention is explained based on FIGS. 23 to 25.

(1) Arrangement of Photographic Image Processing Apparatus

FIG. 23 is a block diagram showing an arrangement of a photographic image processing apparatus concerned with the present embodiment.

FIG. 23 has an arrangement added with a connection of from a combining unit 5 to a memory 4, as compared to FIG. 1. The same devices or units as those of FIG. 1 are omitted of explanations, to make explanations on only the added part.

A composite image signal 10 is sent not only to the display/control unit 3 but also to the memory 4. The composite image signal 10 sent to the memory 4 is stored in the memory 4.

(2) Process Flow in Photographic Image Processing Apparatus

FIG. 24 is a flowchart showing a process flow in the photographic image processing apparatus of this embodiment.

At first, a subject image is stored, similarly to S701 of FIG. 7 (S2401).

Then, in the stored image, a predetermined region is set as a transparent region (S2402).

Next, the user takes a picture of the subject (S2403) The partially-transparent image is superimposed over the subject image thus taken (S2404).

Then, a composite partially-transparent image is displayed (S2405).

Finally, picture-taking is terminated according to a user's instruction, to store a resultant image of the subject image taken immediately before ending of the imaging and to store the partially-transparent image (S2406).

According to the present embodiment, because of storage of a resultant image, the user is allowed to review the saved resultant image at a later day or to send it by attached on an e-mail.

(3) Modifications

At S2406, there is a case of encountering a positional deviation of image pickup device in the apparatus due to user's operation for issuing instructions. Thereupon, deviation occurs between; the composite image having been displayed immediately before the user's instruction; and the image actually saved.

In order to prevent such deviation, the composite image may be stored by using an image of after a predetermined time from the user's instruction. For example, where the cellular telephone equipped with camera shown in FIG. 25 is utilized, the composite image may be saved after a predetermined time from user's pressing of the button 2504 or 2512.

Due to this, it is possible to obtain a composite image desired by the user because of no occurrence of deviation. It is convenient to the user to display a delay time in saving the composite image.

Fourth Embodiment

Figure 26:
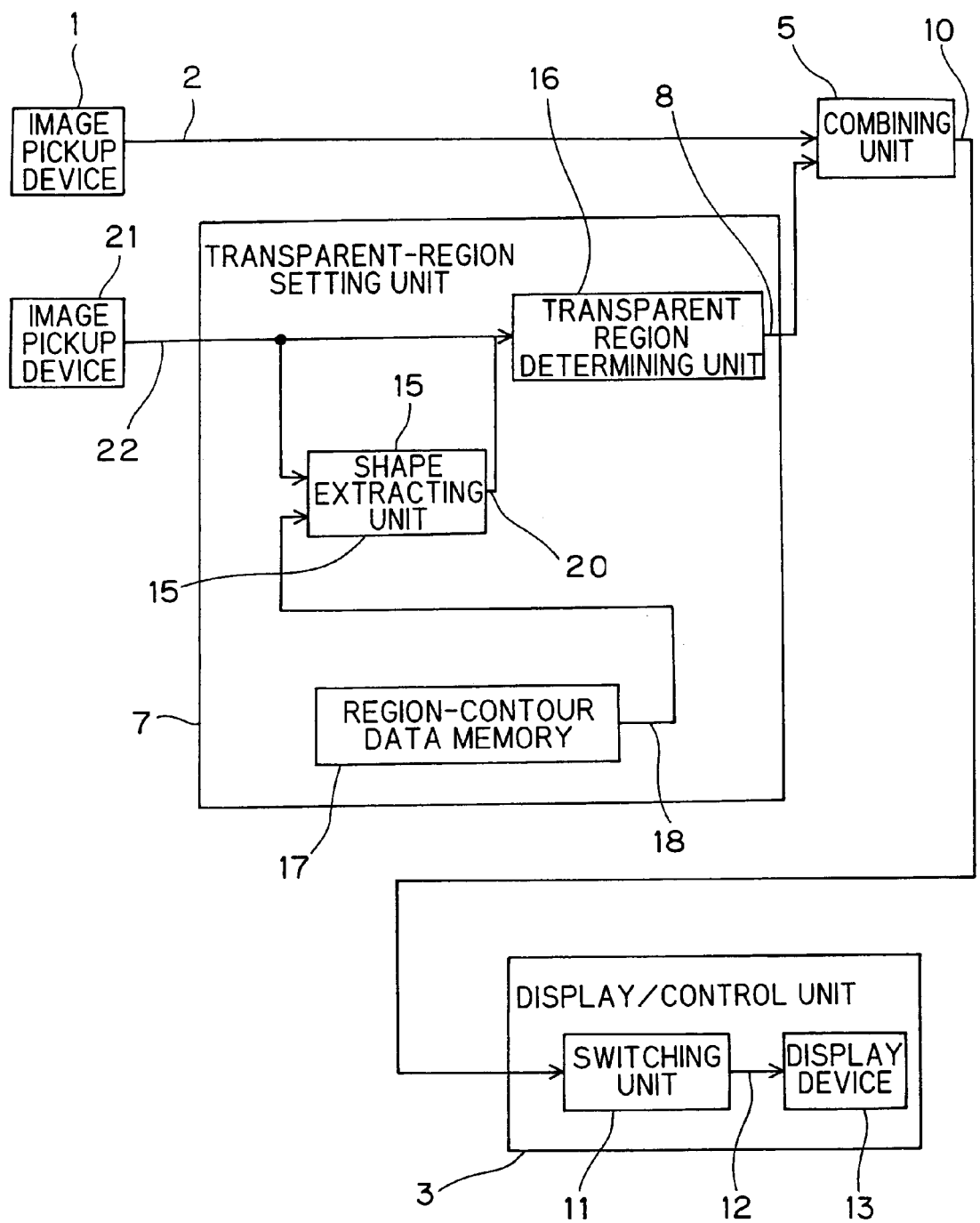
FIG. 26 is a block diagram showing an arrangement of a photographic image processing apparatus concerned with a fourth embodiment of the present invention.
Figure 27:
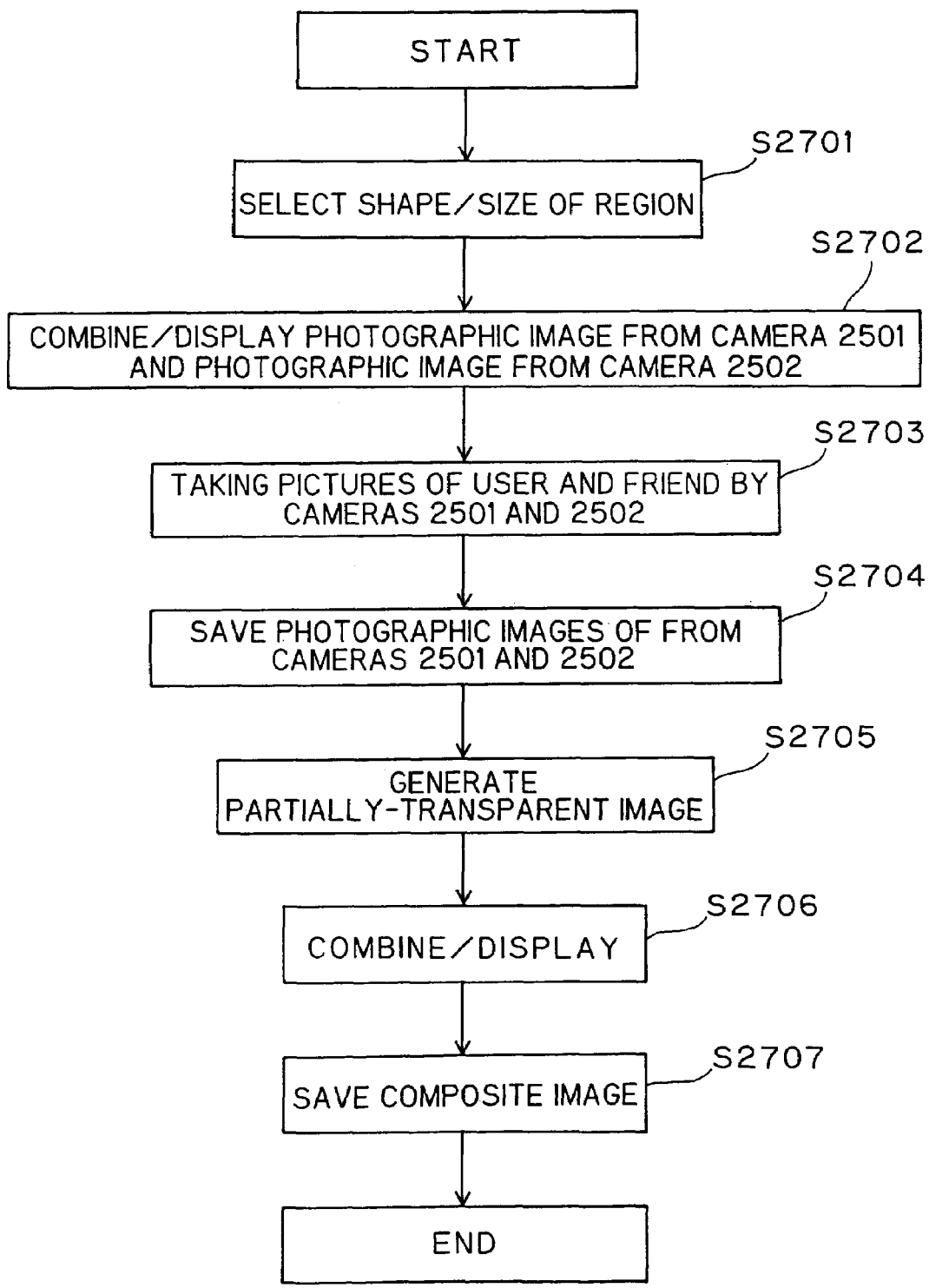
FIG. 27 is a flowchart showing a process flow in a case to superimopse a friend image over one's own image according to an embodiment of the invention.
Figure 28:
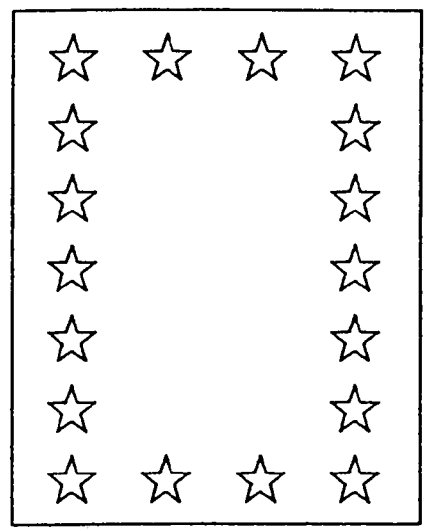
FIG. 28 is a partially-transparent image in the prior art.
Figure 29:
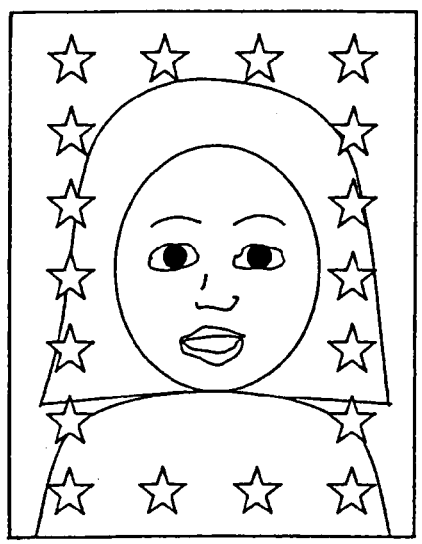
FIG. 29 is a composite image using the partially-transparent image of the prior art.

A fourth embodiment of the invention is explained based on FIGS. 25 to 27.

(1) Arrangement of Photographic Image Processing Apparatus

FIG. 26 is a block diagram showing an arrangement of a photographic image processing apparatus concerned with the present embodiment. Explanation is made on only the difference from the embodiment explained so far. It is noted that region-contour data memory 17' is equivalent to the stencil-pattern data memory 17 on FIG. 6.

An image pickup device 21 takes a picture of a subject. This provides a subject image signal 22 to be sent to a transparent-region setting unit 7. In the transparent-region setting unit 7, the subject image signal 22 is sent to a shape extracting unit 15 and transparent region determining unit 16. The image pickup device 21 herein is for example a CCD camera or MOS camera capable of outputting image signals, similarly to the image pickup device 1.

(2) Process Flow in Photographic Image Processing Apparatus

Exemplifying the case utilizing the cellular telephone equipped with camera shown in FIG. 25, the process flow in this embodiment is explained in detail while referring to the flowchart shown in FIG. 27.

At first, shape and size of a region, are selected (S2701).

Then, with a subject image taken by the first camera 2501, combined is a partially-transparent image that is an image taken by the second camera 2502 and set with a transparent region as coincided with the region selected at S2701; so that the partially-transparent image is superimposed over the subject image to produce and display a composite image (S2702). Displayed is a composite image having, at the interior of the region selected at S2701, a subject image taken by the first camera 2502; and, at the exterior, the partially-transparent image taken by the second camera 2502. According to the present embodiment, because two cameras are utilized, a composite image is to be immediately displayed.

Then, the user directs the camera 2501 to himself/herself and the camera 2502 to his/her friend. In order to display an image of a person having his/her face wearing friend's hairstyle, he/she moves the cellular telephone or has the friend moved or moves himself/herself (S2703).

Next, by a user's instruction, the picture-taking with the cameras 2501 and 2502 is terminated, to save the images of respectively from the first and second cameras 2501 and 2502 taken immediately before ending the picture-taking (S2704).

Then, by use of the image taken by the second camera 2502 and the region selected at S2701, extracted is a friend face outline excepting the hair; and interior of the outline is set as a transparent region. Thus obtained image is stored as a partially-transparent image (S2705).

Subsequently, the partially-transparent image is superimposed over the image taken by the first camera 2501, and displayed (S2706). The composite image is an image of a person having his/her face wearing the friend hairstyle. Because the composite image displayed at S2706 is based on the friend face shape excepting the hairstyle at S2705, it is possible to obtain an image that unnaturalness is to be less felt than the composite image displayed at S2703.

Finally, the composite image is saved according to a user's instruction (S2707).

(3) Modifications (3-1) Modification 1

At S2702, the region that is selected at S2701 may be indicated by a dotted line.

Meanwhile, the dotted line for the region maybe switched over between display and non-display, according to a user's instruction.

(3-2) Modification 2

At S2702, the image of from the first camera 2501, which is explained as displayed at the region interior in the above embodiment, may be displayed at the exterior; and the image of from the second camera 2502, which is explained as displayed at the region exterior in the above embodiment, may be displayed at the interior.

(3-3) Modification 3

The images being displayed at the region interior or exterior respectively taken by the first and second cameras 2501 and 2502 may be changed with each other by switchover.

Due to this, a partially-transparent image can be created from any of a photographic image by the camera 2501 and a photographic image by the camera 2502.

(3-4) Modification 4

The partially-transparent image may be superimposed over an image-processed subject image.

For example, embossing is carried out on own image as the subject image. With this subject image, combined is a partially-transparent image of his/her friend hairstyle.

The resultant image is given by an image of a person having his/her embossed face wearing the friend hairstyle.

Meanwhile, image processing may be made on a partially-transparent image. If doing so, much variety of partially-transparent images can be created.

The image processing may include anti-aliasing, sepia, color correction, vertical expansion/contraction, horizontal expansion/contraction, rotation and so on, besides embossing.

(3-5) Modification 5

Continuously changing images may be inserted between a displaying of an image, which is taken and saved for preparing a partially-transparent image, and a displaying of the composite image.

For example, it is possible to obtain an image displaying that is to change from a friend image into a person having own face wearing the friend hairstyle. By doing so, a variety of composite images can be obtained.

INDUSTRIAL APPLICABILITY

The present invention is well suited for the electronic appliance equipped with the camera function capable of digital-processing, including cellular telephones with camera, personal digital assistants with camera, digital cameras, video cameras and so on.

What is claimed is:

1. An apparatus for processing a photographic image, comprising:
    an image pickup device for taking pictures of subjects;
    an image combining unit for overlaying a subject image as an image of a subject taken by an image pickup device, with a partially-transparent image having a transparent region set therein, thereby creating a composite image;
    a display for displaying the composite image thus created;
    a memory for storing the image taken by the image pickup device as a stored image; and
    a transparent-region setting unit for setting a transparent region in the stored image stored in the memory, thereby creating the transparent image,
    the transparent-region setting unit including:
    a stencil-pattern memory configured to store data on a plurality of stencil patterns in advance;
    a stencil-pattern selecting unit configured to select a single stencil pattern from a plurality of stencil patterns in response to a user's operation;
    a setting unit configured to set a shape, size and display position of the selected stencil pattern in response to the user's operation;
    a stencil pattern display unit configured to display the shape of the stencil pattern on the stored image in accordance with the size and display position;
    a modifying unit configured to transform the shape of the stencil pattern on the stored image in accordance with the outline of the subject by using an outline extracting method;
    a shape extracting unit configured to extract a region corresponding to the shape of the transformed stencil pattern from the stored image; and
    a transparent region determining unit configured to determine one of an interior and exterior of the extracted region on the stored image as the transparent region.

2. An apparatus according to claim 1, wherein the image combining unit overlays, with the partially-transparent image, the first subject image that is taken after a predetermined time from an operation for instructing such overlaying by a user.

3. An apparatus according to claim 1, wherein the image combining unit comprises an image-processing unit for image processing at least any one of the partially-transparent image and the first subject image.

4. A method for processing a photographic image, comprising the steps of:
- overlaying a subject image as an image of a subject taken by an image pickup device, with a partially-transparent image having a transparent region set therein, thereby creating a composite image;
- displaying said composite image thus created;
- storing the image taken by the image pickup device as a stored image; and
- setting a transparent region in the stored image stored by the storing step, thereby creating the transparent image, setting a transparent region including the steps of:
- storing data on a plurality of stencil patterns in advance;
- selecting a single stencil pattern from a plurality of stencil patterns in response to a user's operation;
- setting a shape, size and display position of the selected stencil pattern in response to the user's operation;
- displaying the shape of the stencil pattern on the stored image in accordance with the size and display position;
- transforming the shape of the stencil pattern on the stored image in accordance with the outline of said subject by using an outline extracting method;
- extracting a region corresponding to the shape of the transformed stencil pattern from the stored image; and
- determining one of an interior and an exterior of the extracted region on the stored image as the transparent region.

5. A computer-readable medium storing a program for processing a photographic image, when executed causes a computer to implement the functions of:
- overlaying a subject image as an image of a subject taken by an image pickup device, with a partially-transparent image having a transparent region set therein, thereby creating a composite image;
- displaying the composite image thus created;
- storing the image taken by the image pickup device as a stored image; and
- setting a transparent region in the stored image stored by the storing step, thereby creating the transparent image, setting a transparent region implementing the functions of:
- storing data on a plurality of stencil patterns in advance;
- selecting a single stencil pattern from a plurality of stencil patterns in response to a user's operation;
- setting a shape, size and display position of the selected stencil pattern in response to the user's operation;
- displaying the shape of the stencil pattern on the stored image in accordance with the size and display position;
- transforming the shape of the stencil pattern on the stored image in accordance with the outline of said subject by using an outline extracting method;
- extracting a region corresponding to the shape of the transformed stencil pattern from the stored image; and
- determining one of an interior and exterior of the extracted region on the stored image as the transparent region.

* * * * *